United States Patent [19]

Nakano

[11] Patent Number: 4,471,410

[45] Date of Patent: Sep. 11, 1984

[54] RETRACTABLE HEADLIGHT APPARATUS FOR MOTORCAR

[75] Inventor: Masahito Nakano, Asaka, Japan

[73] Assignee: Honda Giken Kogyo Kabushiki Kaisha, Tokyo, Japan

[21] Appl. No.: 375,688

[22] Filed: May 6, 1982

[30] Foreign Application Priority Data

May 6, 1981 [JP] Japan ............................ 56/64395[U]

[51] Int. Cl.³ ............................................. B60Q 1/06
[52] U.S. Cl. .......................................... 362/65; 362/70; 362/233; 362/287; 362/370; 362/420; 362/428
[58] Field of Search ................. 362/40, 43, 47, 50, 362/54, 59, 60, 61, 63, 65, 66, 70, 71, 80, 233, 250, 269, 277, 279, 282, 285, 287, 319, 321, 322, 372, 418, 419, 420, 428, 370; 340/87, 92, 127, 137; 116/46, 51, 53; 248/281.1, 284; 315/81, 82, 138

[56] References Cited

U.S. PATENT DOCUMENTS

| | | | |
|---|---|---|---|
| 641,748 | 1/1900 | Smith | 248/281.1 X |
| 3,188,460 | 6/1965 | Thorsen et al. | 362/418 X |
| 3,526,764 | 9/1970 | Klie et al. | 362/65 |
| 3,532,870 | 10/1970 | Brueder | 362/65 |
| 3,731,079 | 5/1973 | Porsche | 362/65 |
| 4,246,628 | 1/1981 | Ikemizu et al. | 362/65 |
| 4,380,789 | 4/1983 | Craig | 362/65 |

FOREIGN PATENT DOCUMENTS

| | | | |
|---|---|---|---|
| 1102585 | 5/1961 | Fed. Rep. of Germany | 362/66 |
| 2455935 | 11/1974 | Fed. Rep. of Germany | |
| 78031 | 1/1962 | France | 362/61 |

*Primary Examiner*—Richard E. Schafer
*Assistant Examiner*—John E. Griffiths, Jr.
*Attorney, Agent, or Firm*—Armstrong, Nikaido, Marmelstein & Kubovcik

[57] ABSTRACT

A headlight apparatus for a motorcar including a headlight and a mechanism for protruding and retracting the same above and below, respectively, the upper front portion of the car body. The mechanism includes a pair of parallel links on each side of the headlight pivotally attached at one end to the car body and at the other to the headlight, a crank having a pin and being driven by an electric motor and a connector connecting the pin to one of the pair of parallel links intermediate the ends thereof.

2 Claims, 7 Drawing Figures

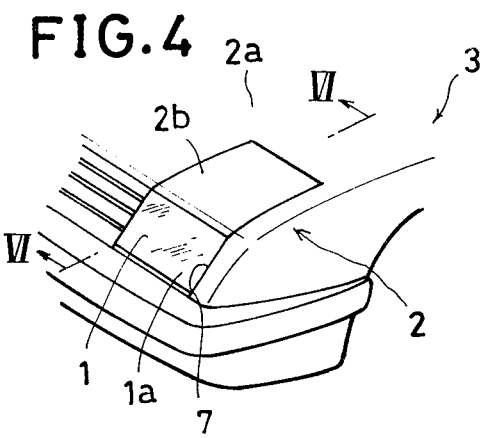
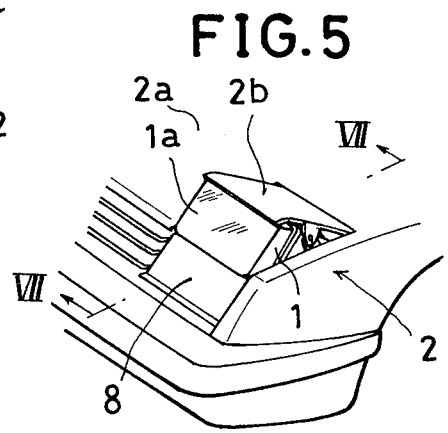
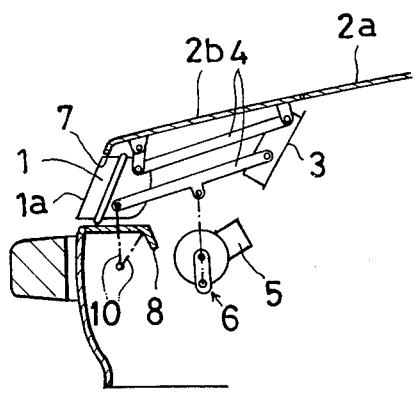
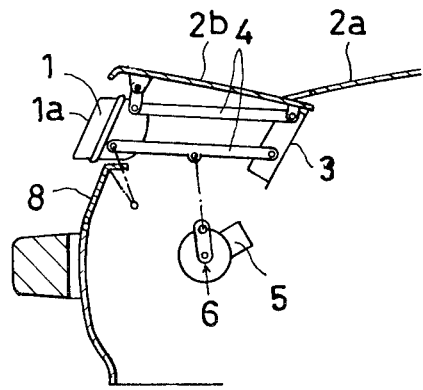

RETRACTABLE HEADLIGHT APPARATUS FOR MOTORCAR

BACKGROUND OF THE INVENTION

1. Field of the Invention

This invention relates to a movable headlight apparatus for a motorcar.

2. Description of the Prior Art

Recently, automobiles have been designed to improve the aerodynamics of the body shape in order to lower fuel consumption and cost. That is, the car body is desired to be comparatively low in height at the front portion thereof, for example, in the area of the bonnet, the front fender and the like. At the same time, the headlights are designed to be retractable.

It has been usual with this type apparatus that the headlight thereof is, in the retracted position, housed in the car body when the car is driven in the daytime. At night, it is raised to protrude outside the car body up to a legally required height. This type of design, however, is inconvenient in that when the headlight is desired to be used momentarily as a passing light or a subsidiary light when it is in the retracted or housed position in the daytime, the use thereof is difficult and is not preferable. If the headlight is raised to the protruded position, it would involve a sacrifice of the improved aerodynamics of the car body.

OBJECTS AND SUMMARY OF THE INVENTION

The present invention has for an object to provide a retractable headlight apparatus free from the foregoing inconvenience.

It is a further object to provide a retractable headlight mechanism that is simple in construction.

It is yet a further object to provide a headlight mechanism that permits the headlight to be usable in a retracted position while capable of being protruded to a legally required height when desired.

These and other objects which will be readily apparent to those skilled in the art are attained in a retractable headlight mechanism comprising a headlight and means for moving the headlight between a first illumination position where the headlight is in a protruded condition raised above the upper surface of the front portion of a car body and a second illumination position where the headlight is in a retracted condition housed in the front portion.

The front portion can be provided with a covering member on each side of the front and upper part thereof. Each covering member is arranged to be freely opened and closed. It can be hingedly attached to the car body. The headlight is provided below each covering member. The above means can comprise a pair of parallel links on each side of each headlight pivotally attached at one end to the car body and at the other end to the headlight, a crank mechanism having a pin, an electric motor mounted in the car body driving the crank mechanism and means for connecting the pin to one of the pair of parallel links intermediate the ends thereof.

A light-passing portion can be formed as the front surface of the front portion of the car body.

BRIEF DESCRIPTION OF THE DRAWINGS

FIG. 4 is a perspective view of another embodiment of this invention, with a headlight being in a retracted condition;

FIG. 5 is a perspective view of the second embodiment, with the headlight being in a protruded condition;

FIG. 6 is a sectional view taken along the line VI—VI of FIG. 4; and

FIG. 7 is a sectional view taken along the line VII—VII of FIG. 5.

DETAILED DESCRIPTION OF PREFERRED EMBODIMENTS

Figure 1:
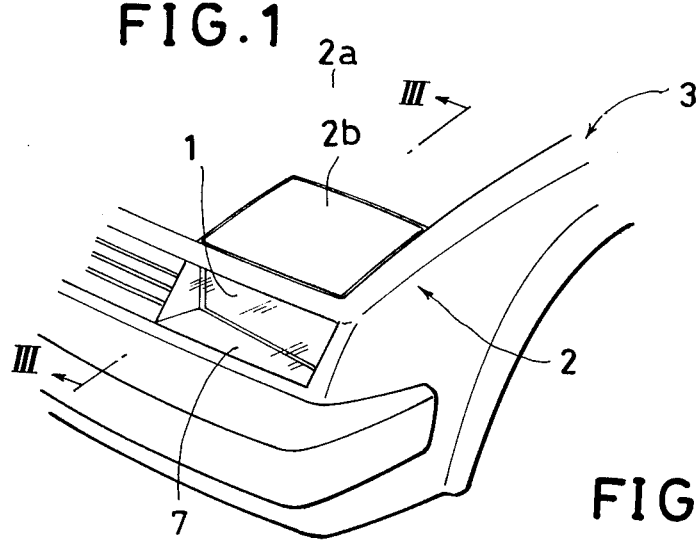
FIG. 1 is a perspective view of one embodiment of this invention with a headlight being in a retracted condition.
Figure 2:
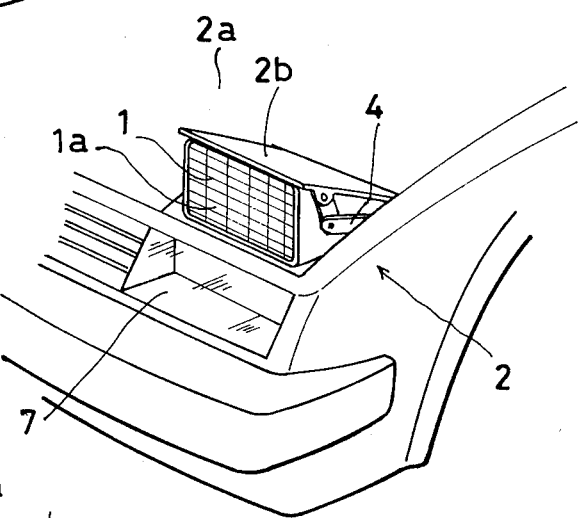
FIG. 2 is a perspective view of the same with the headlight being in a protruded condition.
Figure 3:
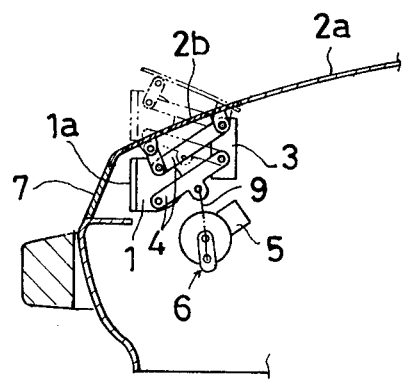
FIG. 3 is a sectional view taken along the line III—III of FIG. 1.

Embodying examples of this invention will now be explained with reference to the accompanying drawings:

Referring to FIGS. 1–3 showing the first embodiment thereof, a headlight 1 is housed in a bonnet 2a constituting a front portion 2 of a car body 3 of a motorcar. The bonnet 2a is provided at each side of a front part 2 of the upper surface thereof with a covering member 2b arranged to be opened and closed freely. The headlight 1 on each side is provided below the covering member 2b and is supported on a pair of parallel links 4,4 provided on the car body 3 so that a lighting surface 1a of the headlight may be directed forwards. Either one of the parallel links 4,4 is connected by a convector 9 to a crankpin 6 of a crank mechanism arranged to be driven by an electric motor 5 so that the headlight 1 may be moved upwards and downwards by turning of the crankpin 6. Thus, the headlight 1 can be changed over between a first illumination position at which the same is in a raised position by the upward movement thereof, while the covering member 2b is opened and a second illumination position at which the same is housed in a retracted position below the closed covering member 2b by the downward movement thereof. A light-passing portion (such as an opening) is made in a front surface of the front portion 2 so that the light of the headlight 1 which is at the second illumination position thereof may pass outside through the light-passing portion 7 closed by a transparent plate or a slitted or lattice plate or the like.

In a second embodiment shown in FIGS. 4–7, the transparent plate or the like closing the light passing portion 7 is omitted. The lighting surface 1a of the headlight 1 itself forms the front surface of the front portion 2 when the headlight 1 is at its retracted position. Additionally, in this illustrated example, the car body 5 is provided with a closing member 8 which is below the headlight 1 and which is arranged to be so swingable that when the headlight 1 is moved obliquely upwards to the protruded position, the closing member 8 is moved therewith to the site which is the initial position of the forwardmost surface 1a of headlight 1, though a linkage mechanism 10 between the closing member 8 and the headlight 1 closes the space left by the headlight.

The operation of this invention is explained as follows:

The headlight 1 is used in the nighttime under the condition that it is at the protruded position raised from the upper surface of the front portion 2 and is used in the daytime as a passing light or the like under the condition that it is at the retracted position housed in the front housed in the front portion 2.

Thus, according to this invention, the headlight is so provided as to be changeable over between a first illumination position at which the same is at the protruded position raised from the upper surface of the front portion of the car body and the second illumination position at which the same is at the retracted position housed in the front portion so that, in such a type of motorcar that the front portion of the car body is comparatively low in height for improving the aerodynamics thereof, the headlight can be easily raised to required legal height protruded from the front portion of the car body, and can be used as a passing light or the like in the daytime in the condition that the headlight is remained housed in the front portion with no sacrifice of the aerodynamics of the car body.

It is readily apparent that the above-described headlight apparatus meets all of the objects mentioned above and also has the advantage of wide commercial utility. It should be understood that the specific form of the invention hereinabove described is intended to be representative only, as certain modifications within the scope of these teaching will be apparent to those skilled in the art.

Accordingly, reference should be made to the following claims in determining the full scope of the invention.

I claim:

1. A headlight apparatus for a motor car having a car body including a front portion with an upper surface and a front surface, said front surface having an opening therein, said apparatus comprising a headlight having a forwardmost surface arranged to face along the longitudinal axis of the motorcar, means for moving the headlight between a first illumination position where said headlight is in a protruded condition raised above said upper surface and a second illumination position where said headlight is in a retracted condition housed in said front portion with said forwardmost surface still facing along said axis and closing said opening, a closing member pivotally connected to said front portion of said motorcar adjacent said opening, and linkage means interconnecting said closing member and said headlight for closing said opening when said headlight moves to said first illumination position.

2. The headlight apparatus of claim 1 wherein said front portion of said car body is provided at an upper part thereof with a covering member arranged to be opened and closed freely, and said headlight is provided below said covering member, said means for moving the headlights comprising a pair of parallel links on each side of said headlight pivotally attached at one end to said car body and at the other end to said headlight, and a crank mechanism having a crankpin, an electric motor mounted in said car body driving said crankpin, and a connector connecting said crankpin to one of said pair of parallel links intermediate said one end and said other end.

* * * * *